United States Patent [19]

Gautier

[11] Patent Number: 5,188,431
[45] Date of Patent: Feb. 23, 1993

[54] BRAKE SYSTEM WITH DUAL VACUUM BOOSTERS HAVING INTERCONNECTED CHAMBERS AND DUAL MASTER CYLINDERS HAVING INTERCONNECTED HYDRAULIC CIRCUITS

[75] Inventor: Jean-Pierre Gautier, Aulnay Sous Bois, France

[73] Assignee: Bendix Europe Services Techniques, Drancy, France

[21] Appl. No.: 639,868

[22] Filed: Jan. 11, 1991

[30] Foreign Application Priority Data

Jan. 31, 1990 [FR] France ................... 90 01121

[51] Int. Cl.⁵ .................. B60T 13/563; B60T 13/565
[52] U.S. Cl. .................................. 303/4; 303/114.2; 188/345; 188/356; 60/547.1; 60/581
[58] Field of Search .................. 188/345, 356, 357; 303/114 PB, 4; 60/581, 582, 547.1

[56] References Cited

U.S. PATENT DOCUMENTS

| | | | |
|---|---|---|---|
| 3,008,771 | 11/1961 | Moyer | 303/24 |
| 3,201,177 | 9/1965 | Cripe | 303/9.66 |
| 3,517,970 | 6/1970 | Cripe | 303/4 X |
| 3,927,915 | 12/1975 | Adachi | 303/114 PB |
| 4,071,283 | 1/1978 | Van House | 303/114 |
| 4,096,696 | 6/1978 | Van House | 60/581 X |
| 4,708,401 | 11/1987 | Klein | 303/114 PN |
| 4,776,646 | 10/1988 | Siegel | 303/114 PB |
| 4,787,685 | 11/1988 | Klein | 188/356 X |
| 5,005,918 | 4/1991 | Schiel et al. | 303/114 PB |

FOREIGN PATENT DOCUMENTS 2193545  2/1988  United Kingdom .

Primary Examiner—Robert J. Oberleitner
Assistant Examiner—Josie A. Ballato
Attorney, Agent, or Firm—Larry J. Palguta; Ken C. Decker

[57] ABSTRACT

The boosted brake system comprises two tandem master cylinders (15, 16), each controlled by way of the piston of a vacuum booster (10, 11) comprising at least two chambers, one (10) of these brake boosters being controlled by way of a pedal and comprising a valve mechanism making it possible to generate a difference between the pressures prevailing in the two corresponding chambers, and a reservoir (17) for feeding brake fluid to the associated hydraulic circuits the two chambers of one (10) of these boosters communicate respectively with the two corresponding chambers of the other booster (11), and the two hydraulic circuits (30, 32) associated with one (15) of the master cylinders communicate respectively with the two hydraulic circuits (30, 32) of the other master cylinder (16).

1 Claim, 1 Drawing Sheet

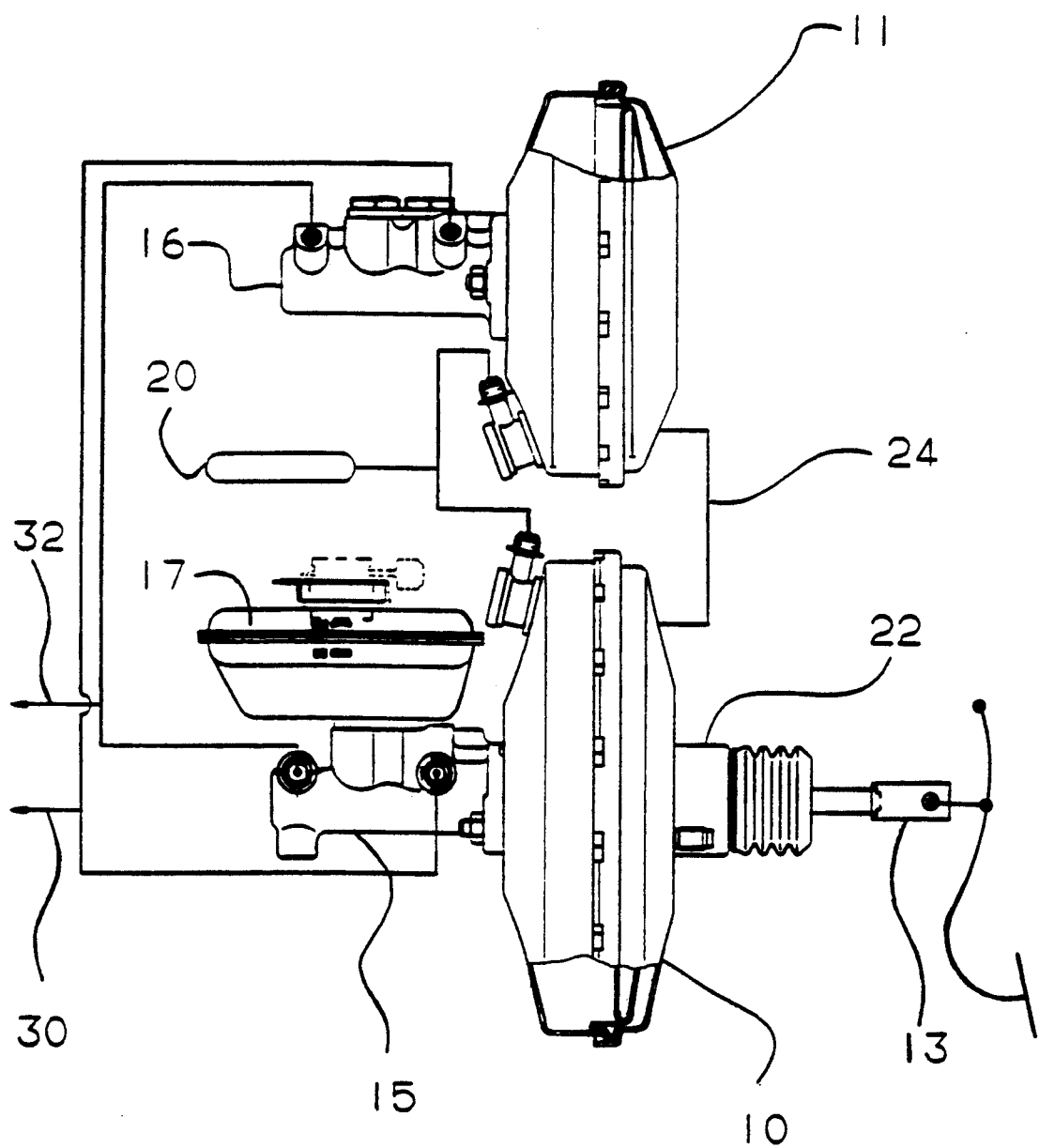

BRAKE SYSTEM WITH DUAL VACUUM BOOSTERS HAVING INTERCONNECTED CHAMBERS AND DUAL MASTER CYLINDERS HAVING INTERCONNECTED HYDRAULIC CIRCUITS

BACKGROUND OF THE INVENTION

The present invention relates to boosted brake systems for motor vehicles and more particularly to systems including more than one vacuum booster.

The elements of these systems are well known to an average person skilled in the art and neither their construction nor their functioning will be dealt with here.

The document U.S. Pat. No. 3,201,177 describes, for example, a system which includes a vacuum booster controlled by a pedal acting on a single master cylinder feeding the brake motors of the front wheels of a vehicle, and a second vacuum booster connected pneumatically to the first and acting on another single master cylinder feeding the brake motors of the rear wheels.

The document U.S. Pat. No. 4,071,283 also makes known a similar system, in which the second booster is fed via a solenoid valve determining the communication of one of its two chambers with the open air, thereby making it possible to perform functions, such as those of a pressure compensator or of a rear-wheel anti-lock system, simply by acting on this solenoid valve.

The document U.S. Pat. No. 4,708,401 describes an alternative version of such a system, in which the solenoid valve is a multi-directional pneumatic solenoid valve.

These systems suffer from many disadvantages. In fact, the reliability and lifetime of a solenoid valve are not identical to those of a vacuum booster, and this can give rise to the deactivation of the brakes of the rear wheels of the vehicle. Moreover, brake systems with three hydraulic circuits or more are considered unsuitable by motor-vehicle manufacturers because of the corresponding increase in the number of bleeding and filling operations to be carried out on the line.

SUMMARY OF THE INVENTION

An object of the present invention is to overcome these disadvantages. Furthermore, other problems arise with boosted brake systems having a single vacuum booster. In fact, vehicles equipped with a wheel antilock device usually demand more brake fluid than vehicles not so equipped, and it is therefore necessary to increase the size of the master cylinder. Consequently, it is also necessary to increase the size of the vacuum booster in order to ensure the same boosting force. Moreover, since the space available in the engine compartment of vehicles is increasingly limited, a problem then arises.

Another object of the invention is to provide a solution to this problem.

The present invention therefore relates to a boosted brake system comprising two tandem master cylinders, each controlled by means of the piston of a vacuum booster comprising at least two chambers, one of the brake boosters being controlled by means of a pedal and comprising a valve means making it possible to generate a difference between the pressures prevailing in the two corresponding chambers, and a reservoir for feeding brake fluid to the associated hydraulic circuits.

According to the invention, the two chambers of one of the boosters communicate respectively with the two corresponding chambers of the other booster, and the two hydraulic circuits associated with one of the master cylinders communicate respectively with the two hydraulic circuits of the other master cylinder.

It is thus possible to use conventional tandem master cylinders of reduced volume and vacuum brake boosters likewise of reduced volume. Moreover, the second booster can be arranged anywhere, this being beneficial to the manufacturers.

BRIEF DESCRIPTION OF THE DRAWINGS

The invention will be better understood, and other objects, advantages and features of it will appear more clearly on a reading of the description which follows of an embodiment given without any limitation being implied and with an accompanying drawing in which:

the single Figure shows diagrammatically a boosted brake system according to the present invention.

DETAILED DESCRIPTION OF THE INVENTION

Referring now to this single Figure, a first vacuum booster 10 is controlled in a conventional way by a pedal pressing on a pusher 13. Like any booster, it comprises at least two chambers separated by a diaphragm fastened to a piston. One of the chambers, called the front chamber, is connected to a vacuum source 20 which can advantageously be the gas intake pipe of the internal-combustion engine or a simple vacuum pump. The other chamber, called the rear chamber, when at rest, is connected to the same vacuum source 20, but, when the driver depresses the pedal, a valve means, for example seated in the neck 22, puts this rear chamber in communication with the atmosphere.

The difference in the pressures prevailing in the front and rear chambers which is thus generated causes the movement of the booster piston which ensures the movement of the pistons of the associated master cylinder 15. The latter is equipped with a brake-fluid reservoir 17, making it possible to feed the associated hydraulic circuits 30, 32 shown partially.

According to the invention, a second booster 11, similar to the first, but not having a valve means for the rear chamber, is connected in parallel to the first booster 10. Thus, the front chambers of the two brake boosters communicate with one another and with the vacuum source 20, while the two rear chambers communicate with one another by means of a conduit 24.

The piston of the second booster 11 ensures the movement of the pistons of a second master cylinder 16, the outlet conduits of which are directly connected to the same two hydraulic circuits 30, 32.

The result of such a system is that the reliability is in no way adversely affected by the addition of this second booster 11, since it will always be possible to brake the vehicle in the event of a failure both of the vacuum source 20 and of one of the hydraulic circuits 30, 32, no element capable of adversely affecting this reliability having been added to the brake system.

Consequently, each of the master cylinders 15, 16 is clearly smaller than that which would have been necessary with a conventional system, and this saves a large amount of space, the more so because the same is true of each of the vacuum boosters 10, 11.

Furthermore, the second booster 11 can be placed anywhere, thereby making it possible to use available spaces not normally accessible.

An average person skilled in the art will appreciate that there can be alternatives to the system, such as, for example, the addition of a third in-parallel brake-booster/master-cylinder assembly identical to the second. The brake boosters 10, 11 can be equipped with systems allowing them to perform the anti-slip function for the driving wheels and the hydraulic circuits with wheel anti-lock systems.

What we claim is:

1. A booster brake system, comprising a first tandem master cylinder controlling the pressure in a first pair of hydraulic circuits and controlled by means of a piston of a respective first vacuum booster, a second tandem master cylinder controlling the pressure in a second pair of hydraulic circuits and controlled by means of a piston of a respective second vacuum booster, each of said vacuum boosters comprising a respective first chamber and second chamber, one of said vacuum boosters being controlled by means of a pedal and comprising valve means that generate a difference between pressures prevailing in the respective first and second chambers of said one vacuum booster, and a reservoir for feeding brake fluid to thy hydraulic circuits, the first and second chambers of said one vacuum booster communicating respectively with the first and second chambers of the other vacuum booster, and the first pair of hydraulic circuits controlled by the first tandem master cylinder communicating respectively and directly with the second pair of hydraulic circuits controlled by the second tandem master cylinder.

* * * * *